United States Patent
Palmer (10) Patent No.: US 6,405,992 B1
(45) Date of Patent: Jun. 18, 2002

(54) PREGROUTED BASEPLATE FOR SUPPORTING ROTATING MACHINERY

(76) Inventor: Kermit L. Palmer, 908 Town & County Blvd., Suite 550, Houston, Harris County, TX (US) 77024

( * ) Notice: Subject to any disclaimer, the term of this patent is extended or adjusted under 35 U.S.C. 154(b) by 0 days.

(21) Appl. No.: 09/665,143

(22) Filed: Sep. 19, 2000

(51) Int. Cl.[7] .................................................. F16M 5/00
(52) U.S. Cl. ................... 248/679; 52/742.16; 52/745.2; 52/292; 29/DIG. 26; 264/267; 264/268; 264/271.1
(58) Field of Search ................................ 248/678, 679; 108/51.11; 29/DIG. 26, 527.1, 888, 897, 898.07; 52/742.12, 742.15, 742.16, 745.2, 292; 264/267, 268, 271.1

(56) References Cited

U.S. PATENT DOCUMENTS

| | | | | |
|---|---|---|---|---|
| 2,802,632 A | * | 8/1957 | Byers | |
| 2,916,233 A | | 12/1959 | Ecker | ........................... 248/19 |
| 3,334,850 A | * | 8/1967 | Jackson et al. | |
| 4,050,659 A | * | 9/1977 | McCannon et al. | |
| 4,134,562 A | * | 1/1979 | Paakkinen et al. | |
| 4,505,449 A | * | 3/1985 | Turner et al. | |
| 4,572,474 A | * | 2/1986 | Derlich | |
| 4,670,208 A | * | 6/1987 | Koblischek et al. | |
| 4,826,127 A | | 5/1989 | Koblischek et al. | ........ 248/679 |
| 5,016,338 A | * | 5/1991 | Rowan | |
| 5,037,022 A | | 8/1991 | Rossi | ........................ 228/47 |
| 5,149,050 A | | 9/1992 | Smith et al. | ................. 248/679 |
| 5,277,395 A | | 1/1994 | Smith et al. | ................. 248/679 |
| 5,895,025 A | | 4/1999 | Alesi et al. | ................. 248/678 |

* cited by examiner

Primary Examiner—Robert Canfield
(74) Attorney, Agent, or Firm—Jackie Lee Duke (57) ABSTRACT

A pregrouted base plate and the method of its use and construction with rotating machinery such as pump and electric motor assemblies that are coupled together by a pair of shafts and require precise alignment of those shafts for a long and dependable service life is disclosed. The pregrouted base plate is formed as a generally rectangular parallelepiped structure with one side open. The novel method of its use includes pregrouting the baseplate before installation, curing the grout and machining the mounting surfaces for the rotating machinery before field installation to ensure precise alignment of the pump and motor shafts. A second embodiment is shown with an open frame having two sides open.

14 Claims, 4 Drawing Sheets

PREGROUTED BASEPLATE FOR SUPPORTING ROTATING MACHINERY

BACKGROUND OF THE INVENTION

1. Field of the Invention

This invention relates to a pregrouted baseplate for supporting rotating machinery commonly used in industrial processing and the method of its use and manufacture. This rotating machinery usually takes the form of pumps, commonly referred to as driven equipment, that is powered by electric motors or steam turbines, commonly referred to as drivers.

Typically, industrial processing plants use large quantities of pumps for moving materials, usually in a liquid or gaseous form, through the processing procedures. These pumps are powered by electric motors or steam turbines as noted above that are mounted adjacent to the pump and coupled thereto by drive couplings. These drive couplings allow for a small amount of misalignment between the output or driving shaft of the drivers, i.e., electric motor or steam turbine, and the input or driven shaft of the driven equipment. Precise alignment between these shafts is critical for the pump and motor assemblies to have a reasonable service life. A critical aspect of maintaining this precise alignment is that the pump and motor are mounted to a mounting base or baseplate as they are commonly referred to in the industry.

These baseplates have mounting pads or surfaces that are precisely machined to help ensure proper alignment between the pump and motor shafts discussed above. The mounting surfaces include threaded holes machined to accept mounting bolts that secure the pump and electric motor to the baseplate. The baseplates are then prepared for installation on a foundation in the plant. It is this preparation process that causes problems with the baseplates.

The aforementioned baseplates typically have been a substantially rectangular parallelepiped configuration with one of the large sides missing to form an open box. The interior of this box forms a large cavity that has been the bottom side of the baseplate with the mounting surfaces previously described formed on the top side. In order to add stiffness to the baseplate and reduce vibration from the pump and motor operation, the cavity on the bottom of the baseplate was filled with a grout material such as epoxy or a cementitious material. The baseplate was then installed on a foundation in the plant and the motor and pump reattached. The problem with such a procedure is that the baseplate thus formed was distorted by the shrinkage of the grout material and the aforementioned precisely machined mounting surfaces were often out of tolerance. This resulted in increased vibration of the pump and motor assembly during operation and a shortened service life. The typical solution to date has been to try to remachine the mounting surfaces of the baseplate after the baseplate is installed on the foundation. This has produced less than desirable results as the machines used in the field cannot produce the desired tolerances and the cost of transporting and setting up these machines is prohibitive.

Therefore, there exists a need for a baseplate and the method of its use that will allow the use of epoxy or cementitious grouts while maintaining the required tolerances for the pump and motor mounting surfaces after installation. It is the construction and method of use of such a baseplate to which the present invention is directed.

2. Description of Related Art

U.S. Pat. No. 2,916,233 to M. F. Ecker discloses a pump base that is grouted in place.

A machinery base pad for vibrating machinery is disclosed in U.S. Pat. No. 5,149,050 to D. Smith et al. A plurality of channels and drains are provided to minimize environmental pollution from the lubricants vibrated out of the machine.

U. S. Pat. No. 5,277,395 to D. Smith et al. is a continuation of U.S. Pat. No. 5,149,050 and describes a machinery base pad with a plurality of I beams and tie down fastener subassemblies with a cementitious filler.

SUMMARY OF THE INVENTION

The pregrouted base plate of the present invention and the method of its use and construction is designed for use with rotating machinery such as pump and electric motor assemblies that are coupled together by a pair of shafts and require precise alignment of those shafts for a long and dependable service life. The pregrouted base plate is formed as a generally rectangular parallelepiped structure of suitably thick steel with one side open. The closed or top side of the pregrouted baseplate has a plurality of machined surfaces to which the pump and motor assemble will be bolted. This top surface may have a plurality of vent and grout holes formed therein also. The bottom or open side of the baseplate forms a large cavity into which the grouting material will be poured. This cavity may also have a number of stiffening members or ribs welded in place to minimize distortion of the baseplate. In a typical application of the novel method, the baseplate has the pump and motor assembly removed therefrom and the baseplate is inverted, i.e., the lower cavity is facing upward. If the baseplate has any vent or grout holes as mentioned previously, these are closed off. The surface of the baseplate that will be in contact with the grout material is prepared and cleaned by suitable means as sanding, sandblasting or solvent cleaning to ensure proper adhesion with the grout material. The grout material, either epoxy or cementitious, is prepared and poured into the cavity. The grout material is then allowed to cure. In the case of cementitious grout,. this can be up to five days. If epoxy grout is used and it is desired to accelerate the curing process, the baseplate with grout in place is postcured by maintaining an elevated temperature for a specified time period according to the grout manufacturer's instructions.

After the grouting material is completely cured, the baseplate is then placed on a table such as that of a horizontal boring mill and secured thereto. The mounting surfaces of the top of the baseplate are then checked for specified tolerances for levelness and flatness. The horizontal boring mill is then used to machine the mounting surfaces as required to bring the mounting surfaces into tolerance. Thus, a pregrouted baseplate is formed with the required grout material in position, properly cured and the mounting surfaces for the pump and motor assembly machined within tolerance. The pregrouted baseplate can then be installed on a foundation in the conventional manner.

One object of the present invention is to provide a method for producing a pregrouted baseplate that ensures the mounting surfaces for the pump and motor assembly are within tolerance after the grouting material is installed and cured.

Another object of the present invention is to provide a baseplate with a grouting material previously installed that is distortion free.

A further object of the present invention is to produce a baseplate free of air pockets or voids in the grout material.

Other objects and advantages of the present invention are pointed out in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and futher made clear by reference to the drawings, wherein.

DESCRIPTION OF THE PREFERRED EMBODIMENT

Figure 1:
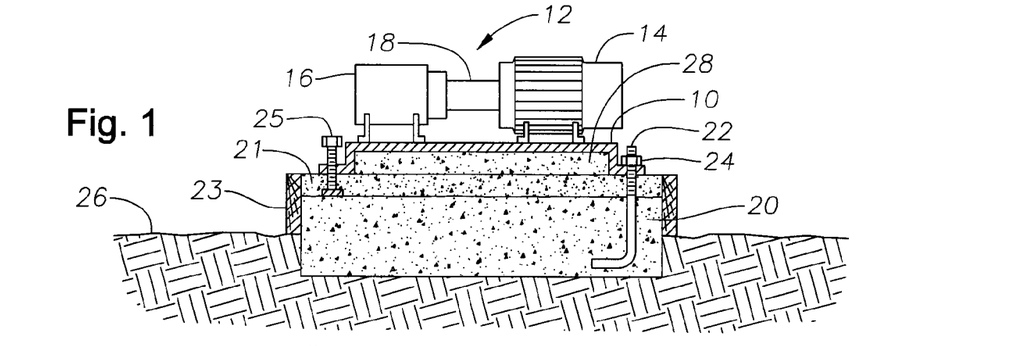
FIG. 1 is an elevation view of a typical pump and motor assembly mounted on a pregrouted baseplate that is attached to a foundation.

With reference to the drawings, and particularly to FIG. 1, an elevational view of a typical pump and motor assembly mounted on a baseplate that is attached to a foundation is shown. The pregrouted baseplate of the present invention is denoted generally by numeral 10. Pregrouted baseplate 10 has rotating machinery such as typical pump and motor assembly 12 mounted thereon. Pump and motor assembly 12 includes electric motor 14 connected to pump 16 by coupling shaft 18. Pregrouted baseplate 10 is secured to foundation or concrete slab 20 by suitable securing means such as anchor bolts 22 and nuts 24 cooperating with jack screws 25 in a manner to be described hereinafter. Foundation 20 is positioned on ground 26 at a suitable location within the customer's plant. Grouting material 28 is seen on the underside of pregrouted baseplate 10.

Figure 2:
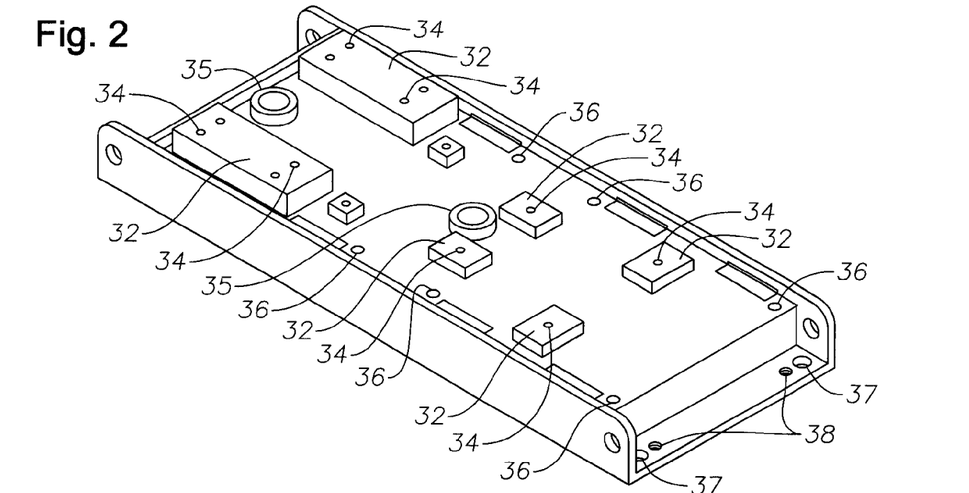
FIG. 2 as a perspective view of a baseplate with the pump and motor assembly removed.
Figure 3:
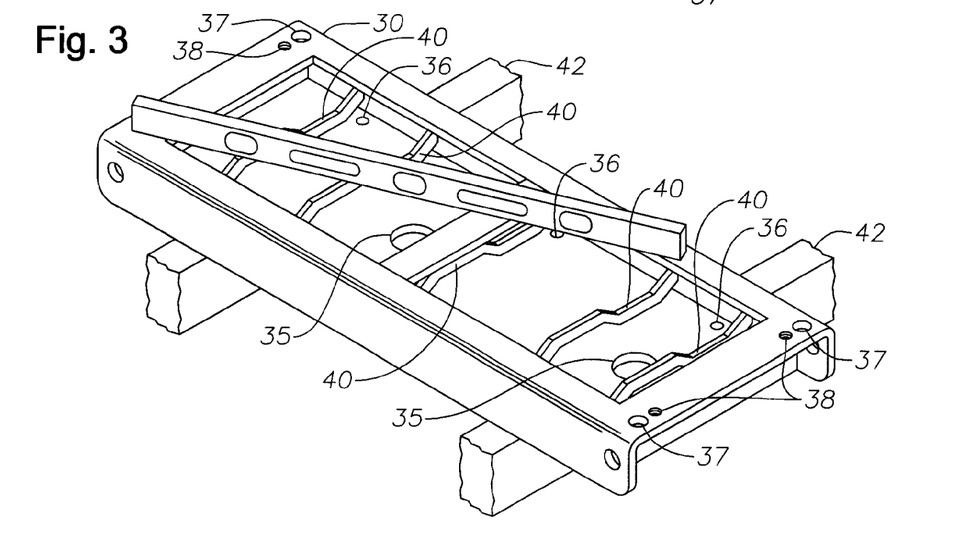
FIG. 3 is a perspective view of a baseplate showing the first step in producing the pregrouted,baseplate.

Grouting material 28 may be inorganic, i.e., cementitious or organic, i.e., epoxy or a combination of both. Typically one or the other is used for a particular job. The novel method of creating pregrouted baseplate 10 will now be shown. As best seen in FIGS. 2 and 3, pregrouted baseplate 10 consists of frame 30 of a generally rectangular parallelepiped configuration. A plurality of mounting surfaces or pads 32 are shown on the top side of pregrouted baseplate 10. Mounting surfaces 32 are adapted to receive rotating machinery such as pump and motor assembly 12 (not shown) with drilled and tapped holes 34 receiving bolts to secure pump and motor assembly 12 thereto. Frame 30 is shown to be of fabricated welded steel construction although other suitable materials such as fiberglass or high strength plastic could be used without departing from the scope of the current invention. Frame 30 also includes grout fill holes 35 and vent holes 36 for reasons to be discussed hereinafter.

Frame 30 also includes anchor bolt holes 37 and jack screw holes 38 positioned at each corner. These are used in leveling and securing pregrouted baseplate 10 to foundation 20. Anchor bolts 22 are positioned in foundation 20 when it is poured to align with anchor bolt holes 37. When it is desired to secure pregrouted baseplate 10 to foundation 20, pregrouted baseplate 10 is placed over foundation 20 as shown in FIG. 1. Anchor bolts 22 pass through anchor bolt holes 37 and then jack screws 25 are threaded through jack screw holes 38 until they contact foundation 20. Jack screws 25 are then used to level pregrouted baseplate 10. Once pregrouted baseplate 10 is leveled nuts 24 are tightened on anchor bolts 22 to secure pregrouted baseplate 10 and prevent any vertical movement. Wooden form 23 well known to those of ordinary skill in the art, is placed around foundation 20. Low viscosity epoxy grout 21 is then poured into the space between pregrouted baseplate 10 and foundation 20. Jack screws 25 will have been previously coated with a suitable material, such an grease, to ensure jack screws 25 do not stick to epoxy grout 21. After epoxy grout 21 is cured, jack screws 25 are removed and pregrouted baseplate 10 is bonded to foundation 20.

FIG. 3 is a perspective view of frame 30 in an inverted position showing the first step in producing pregrouted baseplate 10. Frame 30 is open on the back or bottom side to form cavity 39 into which a grouting material will be poured. Support members or ribs 40 are welded into cavity 39 to aid in stiffening and supporting frame 30. At this first step, frame 30 is supported on suitable supports 42 and inspected for levelness, and overall dimensional tolerances. After the dimensional tolerances are checked frame 30 is ready to be pregrouted.

Figure 4:
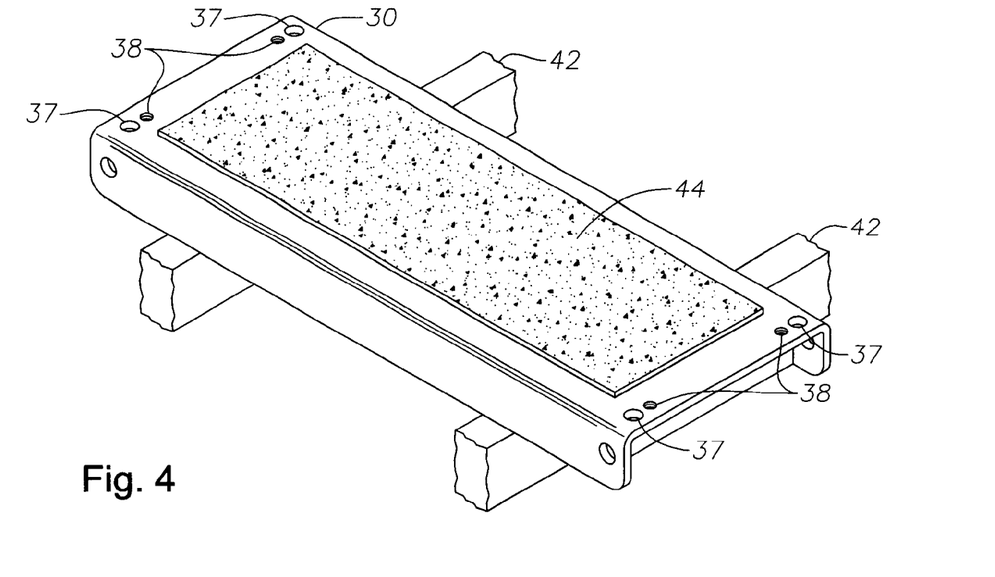
FIG. 4 perspective view of the pregrouted baseplate showing the grouting material in place and curing.

As shown in FIG. 4, grouting material 44 has been prepared and poured into cavity 39 of frame 30. Grouting material 44 is poured until it is approximately level with the top of frame 38 and the excess is then "screened" off as is done in cement finishing and well known to those of ordinary skill in the art. Vent holes 36 and grout holes 35 are covered as noted above to prevent grouting material 44 from escaping. Frame 30 is typical of the frames used today and vent holes 36 are usually provided because the frames 30 are typically grouted in the field with frame 30 in the position of FIG. 2. Applicant's novel method does not require vent holes 36 as any entrapped air from the curing grouting material 44 is vented on the open side of frame 30. Vent holes 36 and grout holes 35 are shown solely for the purpose of demonstrating that applicant's method is equally suitable for use with or without vent holes. Grouting material 44 may be an epoxy or cementitious composition as required.

If it is desired to accelerate the curing process and reduce the curing time, frame 30 with grouting material 44 in place, is maintained at an elevated temperature for a period of time as per the grouting material manufacturer's instructions. The elevated temperature at which the post curing will take place depends on the ambient conditions. If the ambient temperature is above 60° F., the elevated temperature typically will be 10° to 20° above the ambient temperature. When the ambient temperature is below 60° F., the elevated temperature will typically be in the range of 80° to 100° F. This step is important in applicant's novel method as it allows a faster, i.e. shorter, production time for pregrouted baseplate 10.

Figure 5:
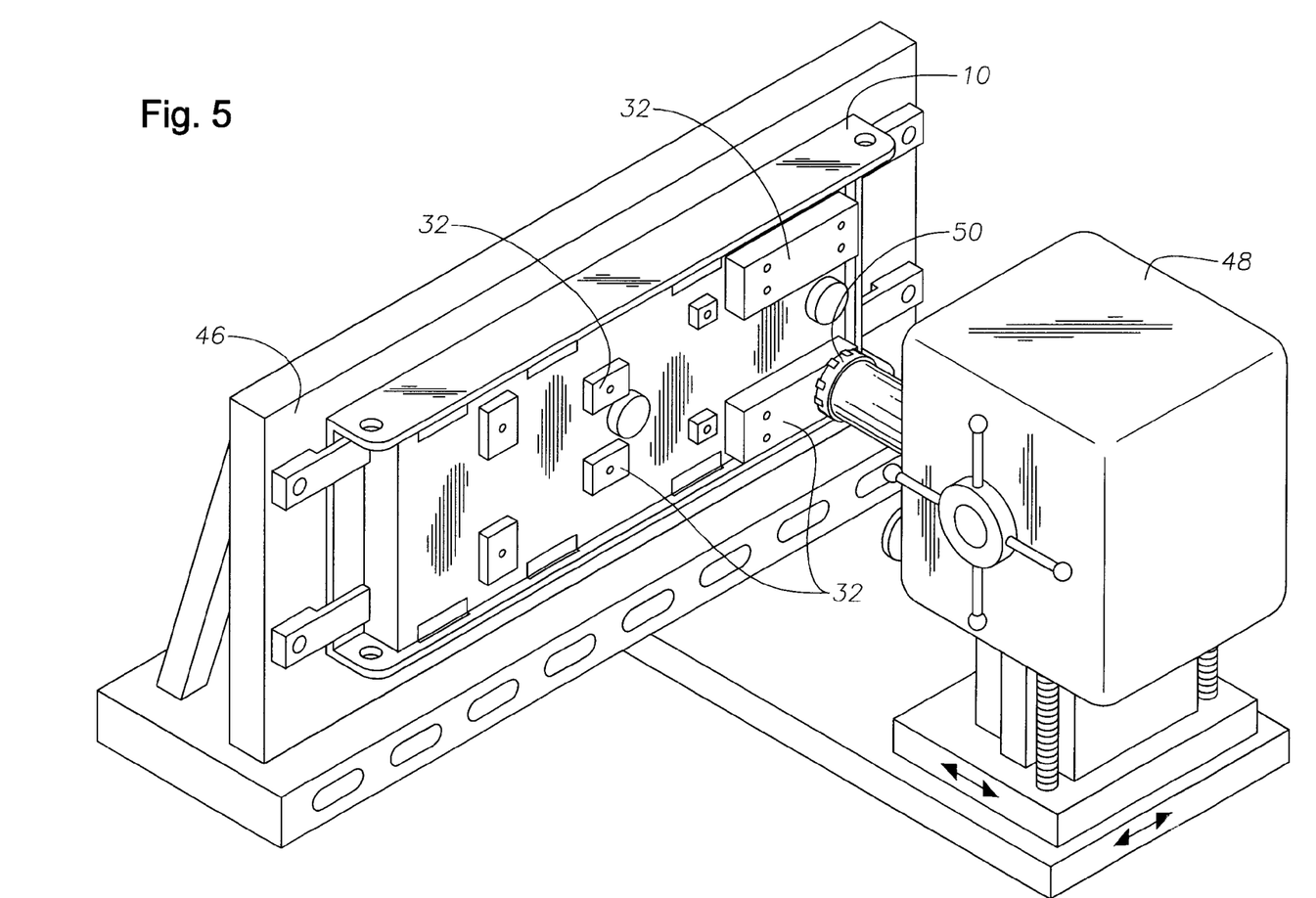
FIG. 5. is a perspective view showing the pregrouted baseplate in place on a machining center and the mounting surfaces being machined to bring them into tolerance.

The next step in applicant's novel method of producing a pregrouted baseplate is shown in FIG. 5. After a complete curing of grouting material 44 is achieved, pregrouted baseplate 10 is mounted in a suitable fixture 46 on a suitable machining center such as horizontal boring mill 48. Mounting surfaces 32 are then checked for dimensional tolerances such as flatness and parallelness. If required, cutting head 50 can then be used to "true" mounting surfaces 32 by machining the surfaces as required. The reason this is required is the stresses imposed by the shrinking of grouting material 44 during curing can cause frame 30 of pregrouted baseplate 10 to distort and move mounting surfaces 32 out of flatness. It is this checking and truing of mounting surfaces 32 after the grouting of cavity 39 that is essential to applicant's invention.

Figure 6:
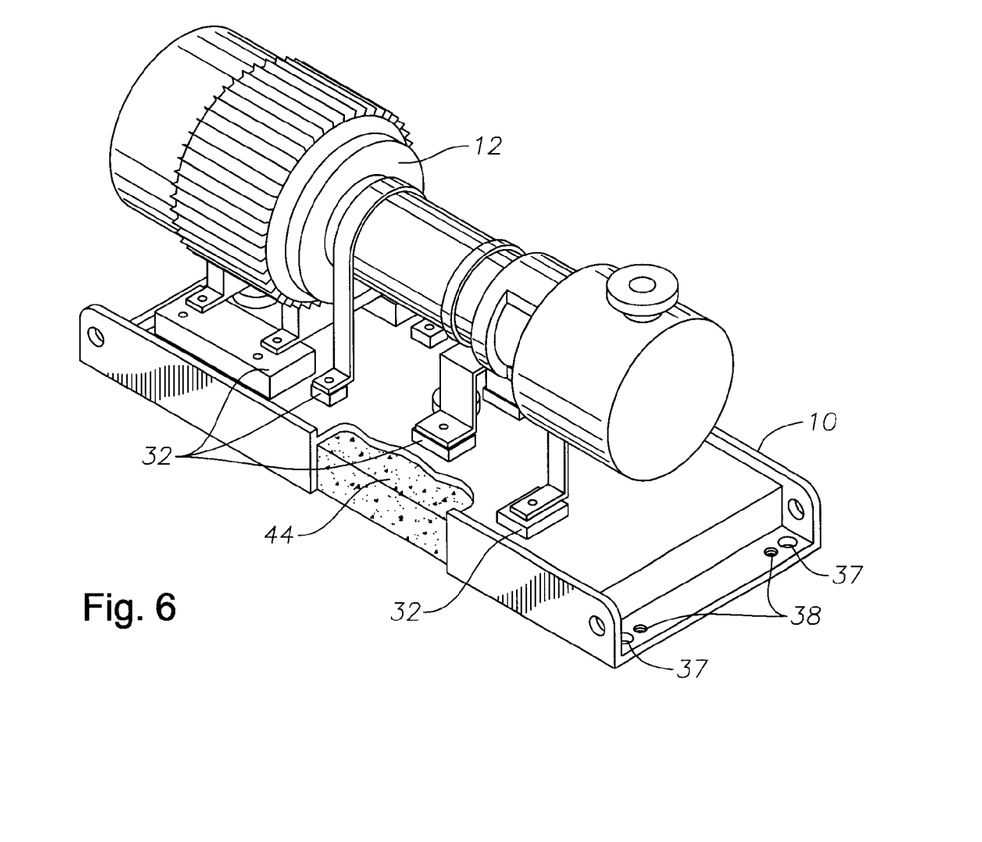
FIG. 6. is a perspective view showing the pregrouted baseplate completed with the pump and motor assembly attached and ready for field installation.

The final step in producing pregrouted baseplate 10 is shown in FIG. 6. Pregrouted baseplate 10 is returned to its normal upright position and: pump and motor assembly 12 is reattached to mounting surfaces 32. Thus a pregrouted baseplate is produced with the grout in place and cured and the mounting surfaces of the baseplate "trued" after the grouting material is in place. This ensures that pregrouted baseplate 10 will not require additional machining after installation and that pump and motor assembly 12 are precisely aligned.

Figure 7:
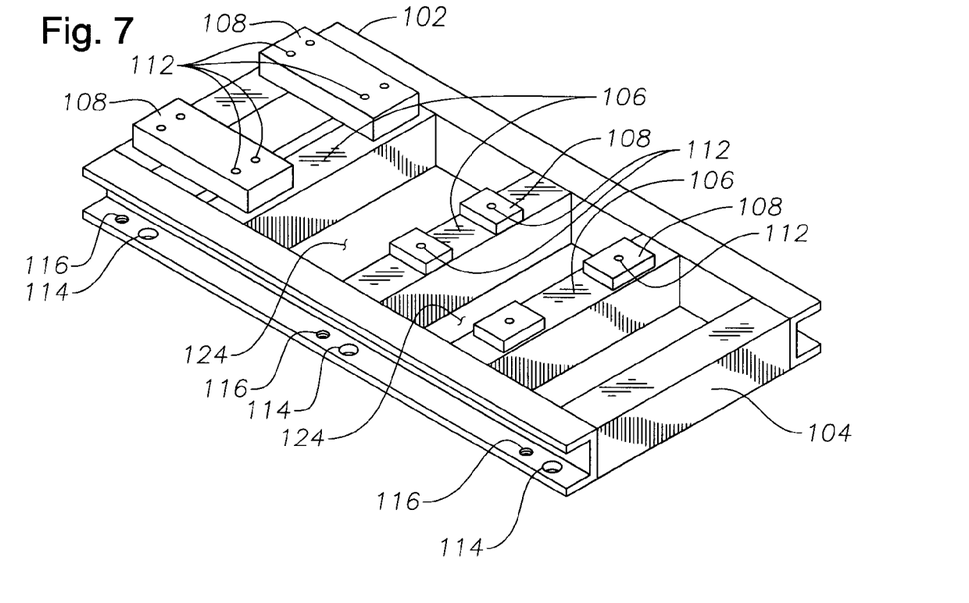
FIG. 7 is a perspective view of an alternate embodiment of a pregrouted baseplate with the pump and motor assembly removed.
Figure 8:
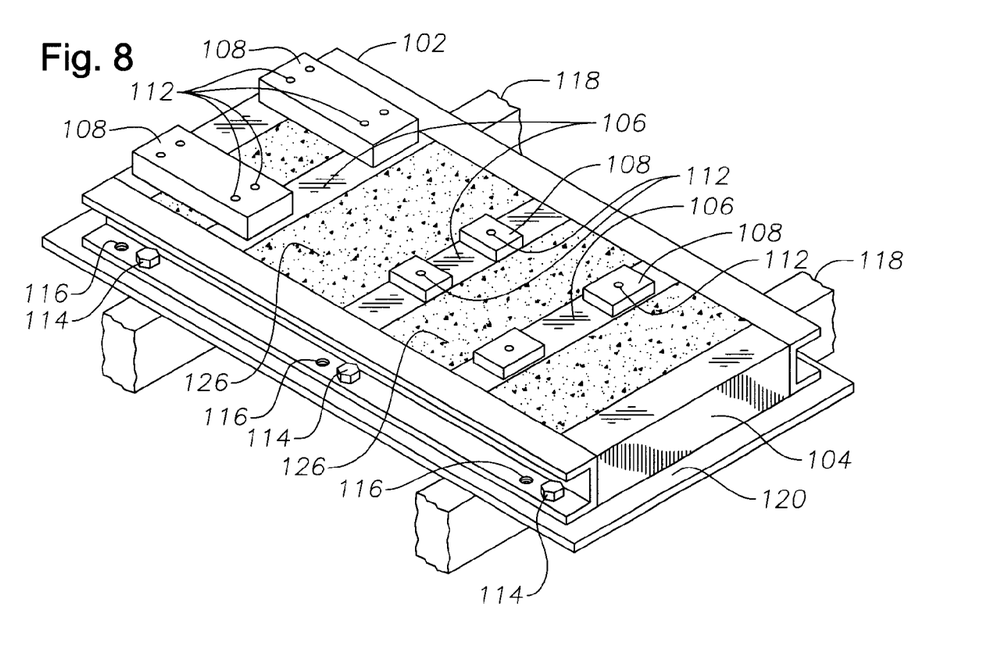
FIG. 8 is a perspective view of an alternate embodiment of a pregrouted baseplate showing the grouting material in place and curing.

An alternate embodiment of the present invention in shown in FIGS. 7 and 8 that allows the use of an open frame. Pregrouted baseplate 100 consists of outer frame 102 of a generally rectangular configuration that is open on the top and bottom to form an open cavity therein. Outer frame 102 is shown constructed of channel 104 welded together to form outer frame 102. Although shown constructed of channel 104, it will understood by those of ordinary skill in the art other suitable structural shapes such as I beam or wide flange beam could be used in the construction of outer frame without departing from the scope of the present invention. Support members or ribs 106 are welded into place to further stiffen and strengthen outer frame 102.

A plurality of mounting surfaces or pads 108 are shown on the top side of pregrouted baseplate 100. Mounting surfaces 108 are adapted to receive rotating machinery such as pump and motor assembly 110 (not shown) with drilled and tapped holes 112 receiving bolts to secure pump and motor assembly 110 thereto. Outer frame 102 is shown to be of fabricated welded steel construction although other suitable materials such as fiberglass or high strength plastic could be used without departing from the scope of the current invention. Outer frame 102 also includes anchor bolt holes 114 and jack screw holes 116 positioned along each side of outer frame 102. Anchor bolt holes 114 and jack screw holes 116 function to level and secure pregrouted baseplate 100 to foundation 20 as in the first embodiment. As best seen in FIG. 8, when it is desired to pregrout pregrouted baseplate 100, outer frame 102 is supported on suitable supports 118 and inspected for levelness, and overall dimensional tolerances. After the dimensional tolerances are checked outer frame 102 is ready to be pregrouted. A suitable grout retaining means secured as waxed plywood sheet 120 is secured to outer frame 102 by bolts 122 to form cavity 124. Waxed plywood sheet 120 is used to ensure grouting material 126 does not stick to sheet 120 while curing. Grouting material 126 is prepared and poured into cavity 124 of outer frame 102. Grouting material 126 is poured until it is approximately level with the top of outer frame 102 and the excess is then "screened" off as is in the previous embodiment. If it is desired to accelerate the curing process and reduce the curing time, outer frame 102 with grouting material 126 in place, is maintained at an elevated temperature for a period of time as per the grouting material manufacturer's instructions. Once a full cure of grouting material 126 is reached, waxed plywood sheet 120 is removed and pregrouted baseplate 100 can then be trued and machined as in the first embodiment.

The novel method of use and construction of my pregrouted baseplate will be readily understood from the foregoing description and, it will be seen that I have provided a novel method of producing a pregrouted baseplate that ensures the rotating machinery attached to the pregrouted baseplate will be properly aligned after installation and curing of the grouting material. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method for preparing and installing a baseplate for supporting rotating machinery, comprising sequentially the steps of:
    (a) preparing and pouring a grouting material into a cavity in a baseplate;
    (b) curing said grouting material to achieve desired physical properties for said grouting material;
    (c) checking the mounting surfaces adapted for supporting a piece of rotating machinery on said baseplate for specified tolerances;
    (d) placing said baseplate in a fixture to allow machining of said mounting surfaces;
    (e) machining said mounting surfaces adapted for supporting a piece of rotating machinery on said baseplate to a specified tolerance; and,
    (f) installing a piece of rotating machinery on said machined mounting surfaces.

2. A method for preparing and installing a baseplate for supporting rotating machinery, according to claim 1, including the step of:
    accelerating the curing of said grouting material by maintaining said baseplate at an elevated temperature for a specified time period.

3. A method for preparing and installing a baseplate for supporting rotating machinery, according to claim 2, further including sequentially the steps of:
    (a) securing said baseplate to a foundation;
    (b) leveling said baseplate;
    (c) placing a form around said baseplate and said foundation; and,
    (d) pouring a grouting material into the void between said baseplate and said foundation.

4. A method for preparing and installing a baseplate for supporting rotating machinery, according to claim 3, wherein:
    said grouting material is an organic grout.

5. A method for preparing and installing a baseplate for supporting rotating machinery, according to claim 1, including sequentially the step of:
    ensuring the curing of said grouting material by curing said grouting material for a specified time period.

6. A method for preparing and installing a baseplate for supporting rotating machinery, according to claim 5, further including sequentially the steps of:
    (a) securing said baseplate to a foundation;
    (b) leveling said baseplate;
    (c) placing a form around said baseplate and said foundation; and,
    (d) pouring a grouting material into the void between said baseplate and said foundation.

7. A method for preparing and installing a baseplate for supporting rotating machinery, according to claim 6, wherein:

said grouting material is an inorganic grout.

8. A method for preparing and installing a baseplate having an open frame configuration for supporting rotating machinery, comprising sequentially the steps of:
  (a) securing a grout retaining means to a baseplate to form a cavity therein;
  (b) preparing and pouring a grouting material into said cavity in said baseplate;
  (c) curing said grouting material to achieve desired physical properties for said grouting material;
  (d) removing said grout retaining means from said baseplate;
  (e) checking the mounting surfaces adapted for supporting a piece of rotating machinery on said baseplate for specified tolerances;
  (f) placing said baseplate in a fixture to allow machining of said mounting surfaces;
  (g) machining said mounting surfaces adapted for supporting a piece of rotating machinery on said baseplate to a specified tolerance; and,
  (h) installing a piece of rotating machinery on said machined mounting surfaces.

9. A method for preparing and installing a baseplate for supporting rotating machinery, according to claim 8, including the steps of:
  accelerating the curing of said grouting material by maintaining said baseplate at an elevated temperature for a specified time period.

10. A method for preparing and installing a baseplate for supporting rotating machinery, according to claim 9, further including sequentially the steps of:
  (a) securing said baseplate to a foundation;
  (b) leveling said baseplate;
  (c) placing a form around said baseplate and said foundation; and,
  (d) pouring a grouting material into the void between said baseplate and said foundation.

11. A method for preparing and installing a baseplate for supporting rotating machinery, according to claim 10 Wherein:
  said grouting material is an organic grout.

12. A method for preparing and installing a baseplate for supporting rotating machinery, according to claim 8, including the steps of:
  ensuring the curing of said grouting material by curing said grouting material for a specified time period.

13. A method for preparing and installing a baseplate for supporting rotating machinery, according to claim 9, further including sequentially the steps of:
  (a) securing said baseplate to a foundation;
  (b) leveling said baseplate;
  (c) placing a form around said baseplate and said foundation; and,
  (d) pouring a grouting material into the void between said baseplate and said foundation.

14. A method for preparing and installing a baseplate for supporting rotating machinery, according to claim 12, wherein:
  said grouting material is an inorganic grout.

* * * * *

(12) EX PARTE REEXAMINATION CERTIFICATE (6381st)
United States Patent
Palmer (10) Number: US 6,405,992 C1
(45) Certificate Issued: Aug. 19, 2008

(54) PREGROUTED BASEPLATE FOR SUPPORTING ROTATING MACHINERY

(75) Inventor: Kermit L. Palmer, 908 Town & County Blvd., Suite 550, Houston, Harris County, TX (US) 77024

(73) Assignee: Kermit L. Palmer, Sugarland, TX (US)

Reexamination Request:
No. 90/007,474, Mar. 24, 2005

Reexamination Certificate for:
Patent No.: 6,405,992
Issued: Jun. 18, 2002
Appl. No.: 09/665,143
Filed: Sep. 19, 2000

(51) Int. Cl.
*F16M 5/00* (2006.01)

(52) U.S. Cl. .................. 248/679; 52/742.16; 52/745.2; 52/292; 29/DIG. 26; 264/267; 264/268; 264/271.1

(58) Field of Classification Search .................. 248/679
See application file for complete search history.

(56) References Cited

U.S. PATENT DOCUMENTS

| | | |
|---|---|---|
| 2,802,632 A | 8/1957 | Byers |
| 2,916,233 A | 12/1959 | Ecker |
| 3,334,850 A | 8/1967 | Jackson |
| 4,050,659 A | 9/1977 | McCannon |
| 4,134,562 A | 1/1979 | Paakkinen |
| 4,505,449 A | 3/1985 | Turner |
| 4,572,474 A | 2/1986 | Derlich |
| 4,670,208 A | 6/1987 | Koblischek |
| 4,826,127 A | 5/1989 | Koblischek |
| 5,016,338 A | 5/1991 | Rowan, Jr. |
| 5,037,022 A | 8/1991 | Rossi |
| 5,149,050 A | 9/1992 | Smith |
| 5,277,395 A * | 1/1994 | Smith et al. .................. 248/679 |
| 5,895,025 A | 4/1999 | Alesi |

OTHER PUBLICATIONS

"Electronic Machinery Grouting Handbook," Escoweld Epoxy Grout Systems, IT Philadephia Resins, May 1999, downloaded from www.escoweld.com on Jun. 27, 2006, including the Tutorial, "Building a Better Foundation, Baseplate Pre–Grouting and Field Epoxy Grouting Techniques".*

Donald M. Harrison, Pre–Grounding of API Pump Baseplates, Epoxy Grout Specifications (Manual), 1992, pp. 1, ITW Philadelphia Resins, USA.

* cited by examiner

*Primary Examiner*—Matthew C. Graham (57) ABSTRACT

A pregrouted base plate and the method of its use and construction with rotating machinery such as pump and electric motor assemblies that are coupled together by a pair of shafts and require precise alignment of those shafts for a long and dependable service life is disclosed. The pregrouted base plate is formed as a generally rectangular parallelepiped structure with one side open. The novel method of its use includes pregrouting the baseplate before installation, curing the grout and machining the mounting surfaces for the rotating machinery before field installation to ensure precise alignment of the pump and motor shafts. A second embodiment is shown with an open frame having two sides open.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *